May 6, 1958     T. C. BENOIT     2,833,077
FISH LURE
Filed April 4, 1955

INVENTOR.
Thomas C. Benoit
BY A. Schapps
ATTORNEY

United States Patent Office 2,833,077
Patented May 6, 1958

2,833,077

FISH LURE

Thomas C. Benoit, Salinas, Calif.

Application April 4, 1955, Serial No. 499,094

3 Claims. (Cl. 43—42.06)

The present invention relates to improvements in a fish lure, and its principal object is to provide a fish lure that revolves when it is dragged through a body of water and flashes and imitates in its whirling motion a live minnow.

A further object of the invention is to provide a lure of the character described that is extremely simple in construction, has no working parts, is sturdy, rust-proof, snag-proof, tangle-proof, and very attractive as a fish lure.

It is further proposed to provide a fish lure which will readily spin when dragged through the water horizontally, while the same lure, if constructed somewhat heavier, will be adapted for bottom fishing, spinning in the water on descent and on ascent.

And finally, it is proposed to provide a fish lure of the character described which may be made of two simple strips of material placed alongside of one another and formed into a lure by a mere twisting movement accompanied by a compressive force tending to separate the body portions of the strips and to spiral the same in the same direction.

Further objects and advantages of my invention will appear as the specification proceeds, and the new and useful features of the invention will be fully defined in the claims attached hereto.

Figure 1:
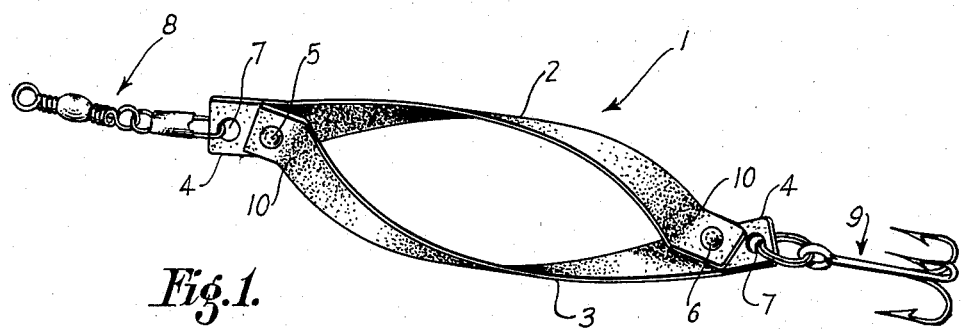
Figure 2:
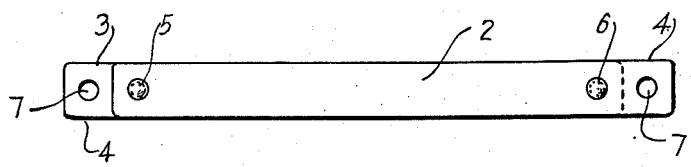
Figure 3:
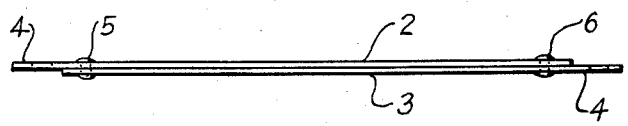

The preferred form of my invention is illustrated in the accompanying drawing forming part of this application, in which:

Figure 1 shows a perspective view of the complete fish lure;

Figure 2, a plan view of two strips of material placed one on top of the other preparatory to the twisting action; and Figure 3, an edge view of the two strips.

While I have shown only the preferred form of my invention, it should be understood that various changes or modifications may be made within the scope of the claims hereto attached, without departing from the spirit of the invention.

Referring to the drawing in detail, my fish lure 1 is made of two complementary strips 2 and 3 of equal length and width and thickness, placed one on top of the other in such a manner that one projects beyond the other at one end, as at 4, while the other projects at the other end an equal distance, the two strips being riveted together, by single rivets 5 and 6, near the projecting ends.

The strips may be made of any suitable, shiny material, such as brass, stainless steel, chromium-plated brass, or suitable plastic material.

In the instance selected for the purpose of illustration, the strips are five inches long, one-half an inch in width, and have a thickness of one thirty-second of an inch.

The rivets 5 and 6 are made sufficiently tight to firmly press the ends of the strips upon one another, but they allow of slight angular motion of the end with respect to one another, as inherent in the twisting motion.

The ends of the rivets may be polished or finished to simulate eyes.

The projecting ends 4 of the two strips are suitably perforated, as at 7, to provide attaching means for the line 8 and the hook 9.

In forming the lure from the two assembled strips, the body portions of the strips are forced away from one another, by any suitable instrumentality, to form two outward curves, as shown in Figure 1, leaving ample space between the same.

The strips are then twisted, by gripping opposite ends and turning the same in opposite directions to produce the two spirals, as shown in Figure 1.

During this operation, the fore-shortened ends of the strips turn slightly upon the longer ends, on the rivets, and the gripping tools used press the ends upon one another sufficiently to maintain the ends in firm contact, so as to form slight bends 10 at the beginning of the spiral curvatures.

The two ends are twisted preferably through an angle of ninety degrees.

In use, when the lure is trolled through the water horizontally, the two spirals or strips cooperate in imparting a revolving, whirling motion to the lure, in simulation of the movement of a live minnow.

When constructed of heavier material, for deep water or bottom fishing, my lure will revolve and whirl in a similar manner in its descent and ascent through the water.

The lure is economic and simple in construction, cheaply made, sturdy, and does not tangle easily, due to its open structure. The ever changing angularity of its spiral strips causes the light to reflect and flash in all directions, which, in combination with the whirling and revolving motion, is very effective in attracting the fish.

I claim:

1. A fish lure comprising two elongated, flat strips of material of equal length and width, each having a flat end portion and a projecting end portion directly secured upon one another with the projecting portion of one strip extending beyond the end portion of the other strip at the front of the lure, and the projecting portion of said other strip extending beyond the end portion of said one strip at the rear of the lure, and each end portion being twisted longitudinally with respect to the projecting portion to which it is secured, intermediate portions of the strips being spaced and twisted through approximately one-quarter of a turn, and the projecting end portions having line and hook connections directly attached thereto.

2. A fish lure comprising two elongated, flat strips of material of equal length and width, each having a flat end portion and a projecting end portion directly secured upon one another, with the projecting portion of one strip extending beyond the end portion of the other strip at the front of the lure, and the projecting portion of said other strip extending beyond the end portion of said one strip at the rear of the lure, and each end portion being twisted longitudinally with respect to the projecting portion to which it is secured, intermediate portions of the strips being curved away from each other from opposite ends to their center and being twisted through substantially one-quarter of a turn in the same direction to present spirals cooperative in revolving the lure when trolled through a body of water, and the projecting end portions having line and hook connections directly attached thereto.

3. A fish lure comprising two elongated, flat strips of material having flat end portions directly riveted upon one another in face-to-face relation and with frictional resistance to turning movement, and having their intermediate portions spaced and twisted into spiral form so as to leave the space between the intermediate portions entirely unobstructed.

References Cited in the file of this patent

UNITED STATES PATENTS

| | | |
|---|---|---|
| 295,350 | Chapman | Mar. 18, 1884 |
| 614,411 | Rockwood | Nov. 15, 1898 |
| 2,606,387 | Garner | Aug. 12, 1952 |
| 2,632,276 | Hale | Mar. 24, 1953 |
| 2,739,405 | Martin | Mar. 27, 1956 |

FOREIGN PATENTS

| | | |
|---|---|---|
| 612,352 | France | July 31, 1926 |